United States Patent

[11] 3,618,087

[72] Inventors Frank Edward Smith;
Frederick Reginald Cross, both of Ottawa, Ontario, Canada
[21] Appl. No. 5,489
[22] Filed Jan. 26, 1970
[45] Patented Nov. 2, 1971
[73] Assignee Her Majesty Queen of Canada represented by the Minister of National Defense

[54] ANTICLUTTER RADAR RECEIVER
2 Claims, 3 Drawing Figs.
[52] U.S. Cl. ........................................ 343/7.7, 343/17.1 R
[51] Int. Cl. ........................................ G01s 9/42
[50] Field of Search .......................... 343/7.7, 17.1 R

[56] References Cited
UNITED STATES PATENTS
3,530,466  9/1970  Simon et al. ............ 343/7.7

Primary Examiner—T. H. Tubbesing
Attorney—Stevens, Davis, Miller & Mosher

ABSTRACT: The application discloses an anticlutter signal-processing radar receiver used as an air traffic control radar.

The radar receiver uses a single receiving channel including an intermediate-frequency logarithmic amplifier which operates without loss of phase information in a received signal, and the intermediate frequency output of which is applied to a phase detector effective to produce a bipolar video signal. The channel also includes a canceller and a full wave rectifier, arranged to eliminate ground clutter from the processed input signal and a fast-time-constant circuit in conjunction with a logarithmic video amplifier effective to reduce rain clutter in the processed input signal which enables a target signal, occurring in rain clutter in a received signal, to be observed.

ANTICLUTTER RADAR RECEIVER

This invention relates to anticlutter signal-processing radar receivers and finds particular application to air traffic control radars.

Air traffic control radars are used primarily to control the movement of aircraft in a given area. To carry out this function it is imperative that a high probability of radar detection of all aircraft in the area of interest is achieved at a low false alarm probability.

Unfortunately, short-range radar is subject to very strong interference signals from the surrounding terrain, buildings, trees, mountains etc. which constitute ground clutter. Radar signal returns from precipitation seriously degrade the performance of the radar. A particularly bothersome form of precipitation interference is rain clutter. These unwanted signal returns from the surrounding terrain and from precipitation are in direct competition with the desired target return signals from aircraft.

There are many known cases where ground clutter, or rain clutter, or simultaneous presence of both these forms of clutter have made the radar unusable for the detection and controlling of aircraft.

At the present time the effects of ground clutter are reduced by employing MTI (Moving Target Indication) techniques in the radar. This technique is based on the fact that ground clutter is composed of return signals from reasonably stationary targets which have zero or, at most, a small radial velocity component relative to the radar. Such signal returns may be cancelled to a large degree by appropriate signal processing while allowing return signals from aircraft which possess a radial velocity component to the radar, to be displayed. The MTI technique does not cancel rain clutter, in general, because rain clutter is composed of radar returns which do possess a radial velocity component. Thus, rain clutter signals are painted on the PPI (Plan Position Indicator) display.

A big advantage of the MTI processor is that it does possess a subclutter visibility capability (i.e. the desired aircraft signal return power may be orders of magnitude less than the competing ground clutter power and still be visible on the PPI display).

One method which can be employed for reducing rain clutter is a linear radar receiver followed by an FTC (Fast Time Constant) circuit. A better method for this task is to employ a logarithmic receiver followed by FTC circuits. These two forms of signal processing provide superclutter visibility only (i.e. the desired aircraft signal return power must be greater than the competing ground or rain clutter power to paint on the PPI display).

Another technique which can be employed for reducing rain clutter is the use of circular polarization.

An object of the present invention is the provision of an improved method of processing radar signals and the provision of an improved anticlutter signal-processing radar receiver.

According to one aspect of the present invention an anticlutter signal-processing radar receiver comprises a single receiving channel including an intermediate-frequency logarithmic amplifier which operates without loss of phase information in a received signal and the intermediate frequency output of which is applied to a phase detector effective to produce a bipolar video signal, a canceller and full wave rectifier, arranged to eliminate ground clutter from the processed input signal, and a fast-time-constant circuit in conjunction with a logarithmic video amplifier effective to reduce rain clutter in the processed input signal which enables a target signal occurring in rain clutter in a received signal to be observed.

According to another aspect of the present invention, a method of processing returned radar signals comprising acting upon the signals with an intermediate-frequency logarithmic amplifier without loss of phase information in the signal, subjecting the intermediate frequency output of the amplifier to a phase detector to produce a bipolar video signal, subjecting that video signal to a canceller and full wave rectifier to eliminate ground clutter from the processed signal, and subjecting the processed signal to a fast-time-constant circuit acting in conjunction with a logarithmic video amplifier to reduce rain clutter in the processed input signal, whereby a target signal occurring in the original rain clutter can be observed.

The invention will now be described, by way of example, with reference to the accompanying drawings, in which.

Figure 1:
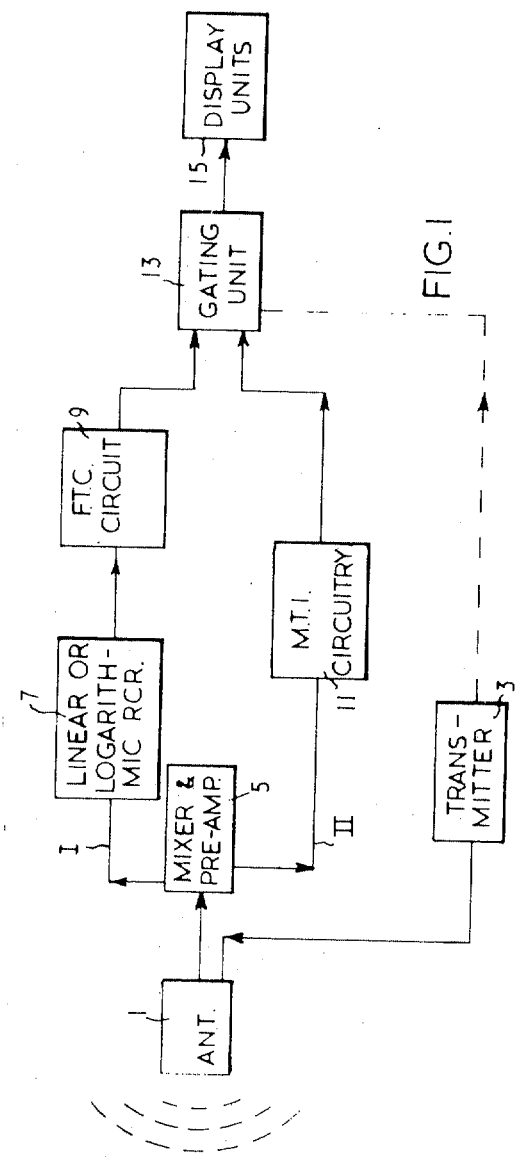
FIG. 1 is a block diagram of radar apparatus with conventional anticlutter arrangements used in a radar receiver.

Referring first to FIG. 1, the antenna system 1 radiates suitable signals received from the transmitter 3 and receives input signals from the desired target and also unwanted input signals in the form of ground and rain clutter. The antenna radiofrequency output is applied to a mixer and preamplifier 5 the intermediate-frequency output from which is applied to a first receiving channel I and to a second receiving channel II. The two receiving channels are gated in at specific ranges depending upon the specific clutter configuration which one is attempting to eliminate. Channel I contains a linear or a logarithmic receiver 7 providing a video frequency output to a fast-time-constant circuit 9, and this channel may be used for normal signal processing or to reduce the effects of ground and rain clutter in all azimuths. In the case of a logarithmic receiver of this type, the logarithmic characteristic is obtained by video summation on a common delay line, therefore, the phase information of the signals is destroyed. Channel II consists of "moving target indication" circuitry 11, which is normally used to reduce the effects of ground clutter. Either channel may be gated by the gating unit 13 to provide the selected output from only one of the two channels to display units 15.

Since a linear receiver or a logarithmic receiver using the video summation technique used in conjunction with a fast-time-constant circuit has no subclutter visibility, when channel I is in use the return signal from an aircraft will be detected only when it is stronger than the signal returned from the terrain (ground clutter) or the precipitation (rain clutter) or, where both occur together, is stronger than the combination of the two. In many cases the signal returned from the ground clutter will be much greater than the signal return from aircraft flying in the same resolution cell. Consequently, with the apparatus set to yield a low probability of false alarms small desired target returns will not be detected.

When channel II is in use, the MTI circuitry, which has subclutter visibility, will reduce the effect of ground clutter but will have, in general, little effect on rain clutter. Thus, for low values of false alarm rate required, aircraft targets will not be detected in the rain clutter.

In summary, using the apparatus of FIG. 1 and a desired value of false alarm rate, neither receiving channel I or II is optimum for processing both types of clutter signals.

Figure 2:
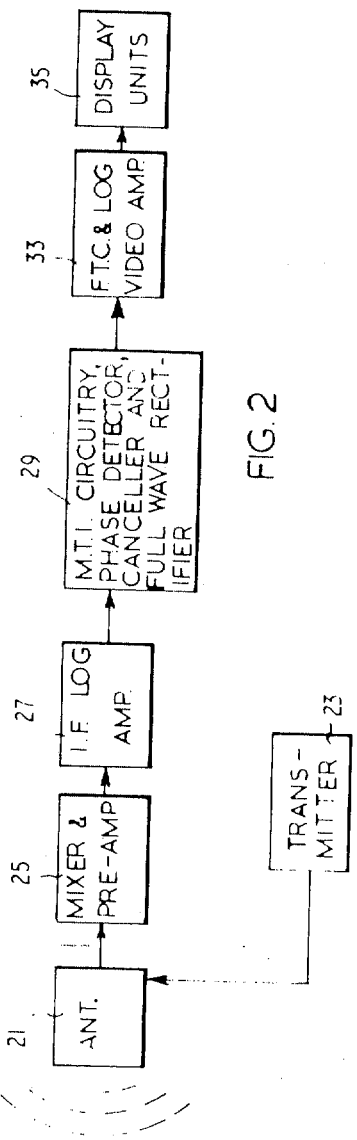
FIG. 2 is a block diagram of a radar apparatus with anticlutter arrangements according to the present invention.

Referring now to FIG. 2, this illustrates an air traffic control radar system in which a single receiver channel is used and which is effective against both ground clutter and rain clutter. In FIG. 2, the antenna system 21 radiates suitable signals received from transmitter 23 and receives input signals from the desired target and also unwanted input signals in the form of ground and rain clutter. The antenna radiofrequency output is applied to a mixer and preamplifier 25 the intermediate-frequency output from which is applied to a phase-preserving, intermediate-frequency logarithmic amplifier 27 with a dynamic range greater than 110 db. Amplifier 27 obtains its logarithmic characteristic at the intermediate frequency and, since it preserves signal phase information, can be used to drive the "moving target indication" circuitry 29 in the radar. The moving target indicator circuitry includes a phase detector which is provided in orthodox manner with a reference signal from a coherent oscillator, canceller and full wave rectifier. The full wave rectifier feeds a logarithmic video amplifier 33 with fast-time-constant circuitry. The differentiated and base-clipped output from amplifier 33 is applied to the display units 35.

Figure 3:
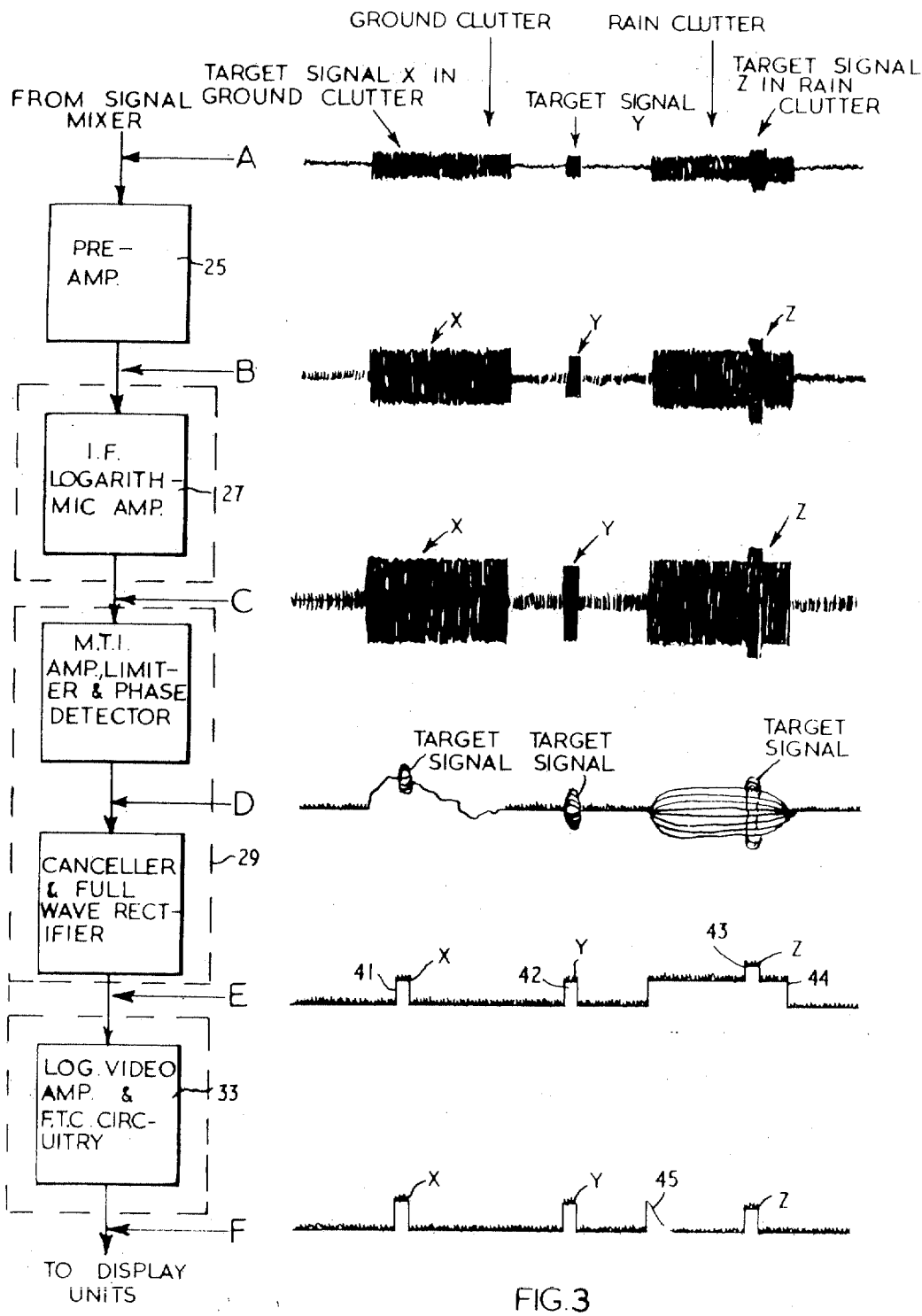
FIG. 3 is a diagrammatic representation of the signals occurring at selected points in the apparatus of FIG. 2.

Considering now the operation of the radar system shown in FIG. 2, this is best understood from a study of FIG. 3, which indicates the form of the processed signal at certain critical points in the radar system. To the left of FIG. 3 are indicated the relevant circuit blocks, identified as in FIG. 2, and at the six interblock positions indicated by arrows A to F a graphical representation of the signal voltage plotted against time is shown.

It will be seen that at point A, the intermediate-frequency input to the preamplifier 25, idealized homogeneous blocks of ground and rain clutter are shown with three target signals. The preamplifier 25 merely amplifies all signals, and the nearer target signal X remains submerged in the ground clutter while the second and third target signals Y and Z can still be discerned.

The logarithmic processing in the amplifier 27 is achieved at the intermediate frequency, and the use of a logarithmic amplifier prevents saturation of the later "moving target indication" circuits by very strong clutter signals. In addition, the IF logarithmic amplifier provides signal-to-interference improvements against certain classes of nongaussian interfering signals. No loss of phase information is caused by the logarithmic amplification. Phase detection is now carried out in the circuit block 29, and results in the bipolar video signal shown at D. After cancellation in the circuit block 29 (cancellation is assumed perfect to make the action of the apparatus more clear), and full wave rectification, only the three target signals (at 41, 42, and 43) and the rain clutter signal (at 44) remain, as shown at E. In the canceller, successive pulses are compared and only those signals having identical characteristics are completely cancelled while all others leave some residual. The canceller is thus effective to compare successive parts of the input signal and to provide an output signal that is proportional to the difference of the delayed and undelayed signals. The unipolar video signals are logarithmically amplified and processed in the fast-time-constant circuitry of block 33, and the differentiated output, after base clipping is as shown at F. It will be seen that the rain clutter signal has deteriorated to a spike 45 at the leading edge of the original clutter signal. The signal at F is then applied to the display units. A synchronizing signal from the transmitter is also applied, according to standard practice, to the display units.

By the use of the circuit described above, the need is eliminated of obtaining a measure of the local environment to ascertain if it is dominated by thermal noise along, ground clutter alone, precipitation clutter alone, or any possible combinations of these interfering signals and then make the decision as to the most desirable signal processor to place in the receiving channel. In the receiver described above, all processing is carried out in a single receiving channel. Thus, complex electronic measuring, decision and switching circuitry is avoided as well as the concomitant unreliability. This single composite signal-processing channel offers the full MTI advantages available in the particular MTI radar system employed for processing ground clutter with attendant subclutter visibility. Further, this single composite processing channel will offer all the benefits available from a logarithmic FTC process in precipitation clutter. The anticlutter receiver is compatible with conventional or more sophisticated MTI processing. In addition, the anticlutter receiver provides advantages over conventional MTI processors for certain classes of nongaussian interfering signals. Furthermore, this receiving channel may also be used with circular polarization so that the rain clutter reduction owing to circular polarization can be obtained. No expensive modifications are required to the existing equipment in the radar.

It will be seen that by the present invention a single receiving channel is provided which will reduce the effects of both ground clutter and rain clutter simultaneously and automatically at all ranges and at every azimuth.

We claim:

1. An anticlutter signal-processing radar receiver comprising: a single receiving channel including:
   a. an intermediate-frequency logarithmic amplifier which is adapted to operate without loss of phase information in a received signal;
   b. a phase detector to which an intermediate-frequency output of the amplifier is applied, and is arranged to provide as output a bipolar video signal;
   c. a canceller and full wave rectifier arranged to receive the bipolar video signal and to eliminate ground clutter from that signal;
   d. a fast-time-constant circuit; and
   e. a logarithmic video amplifier effective in conjunction with the fast-time-constant circuit to reduce rain clutter in transmitting the output from the rectifier; whereby a target signal occurring in rain clutter in a signal received by the receiver is rendered observable.

2. A method of processing returned radar signals comprising:
   a. acting upon the signals with an intermediate-frequency logarithmic amplifier without loss of phase information in the signal;
   b. subjecting the intermediate-frequency output of the amplifier to a phase detector to produce a bipolar video signal;
   c. subjecting that video signal to a canceller and full wave rectifier to eliminate ground clutter from the processed signal; and
   e. subjecting the processed signal to a fast-time-constant circuit acting in conjunction with a logarithmic video amplifier to reduce rain clutter in the processed signal; whereby a target signal occurring in the original rain clutter can be observed.

* * * * *